May 22, 1962  M. L. BENJAMIN ETAL  3,035,461
AUTOMATIC INDEXER WITH SAFETY INTERLOCKS
Filed Oct. 21, 1960  4 Sheets-Sheet 2

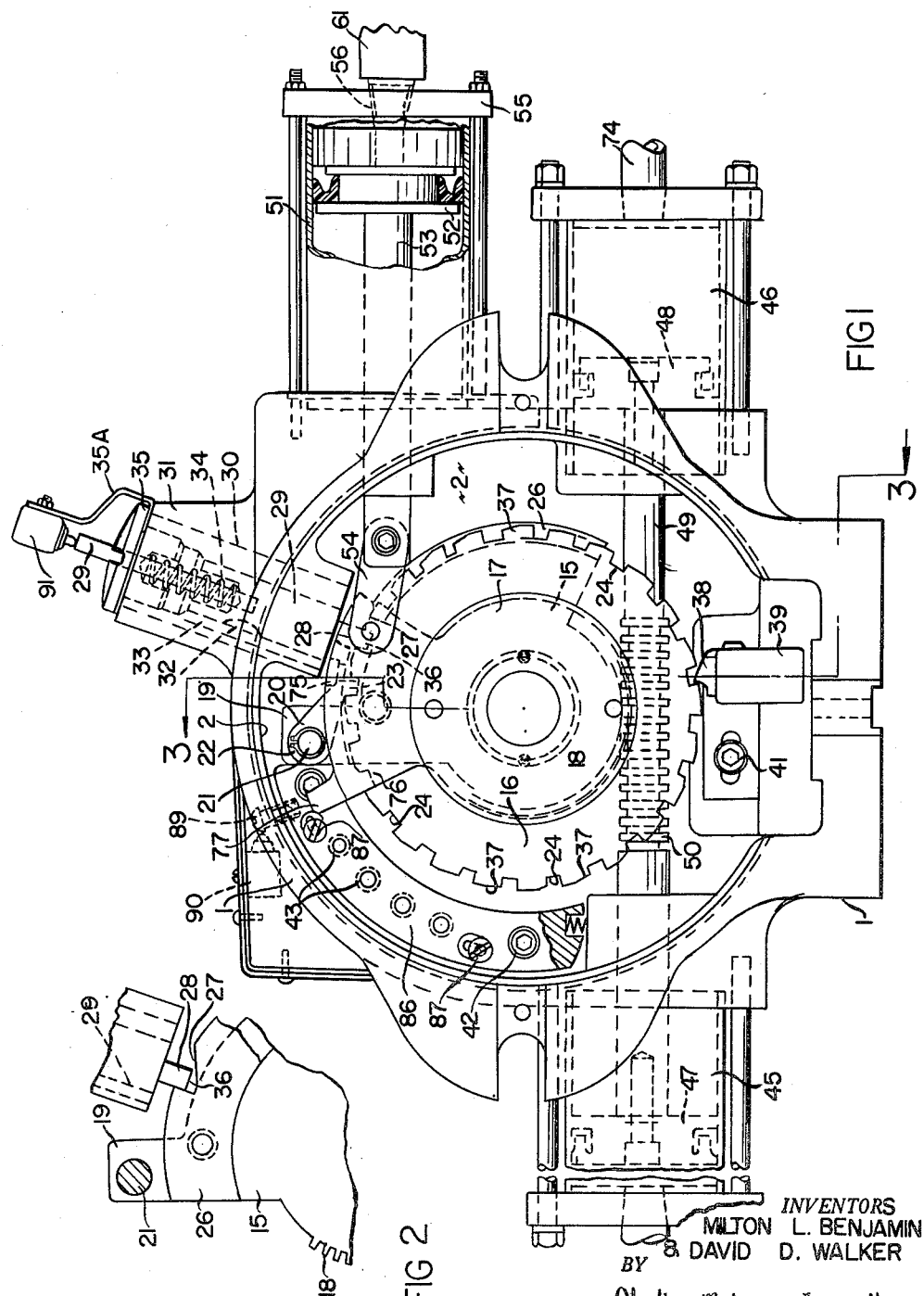

*INVENTORS*
MILTON L. BENJAMIN & DAVID D. WALKER
BY
Oberlin, Maky & Donnelly
ATTORNEYS May 22, 1962  M. L. BENJAMIN ETAL  3,035,461
AUTOMATIC INDEXER WITH SAFETY INTERLOCKS
Filed Oct. 21, 1960  4 Sheets-Sheet 3

*INVENTOR.*
MILTON L. BENJAMIN & DAVID D. WALKER
BY

Oberlin, Maky & Donnelly
ATTORNEYS

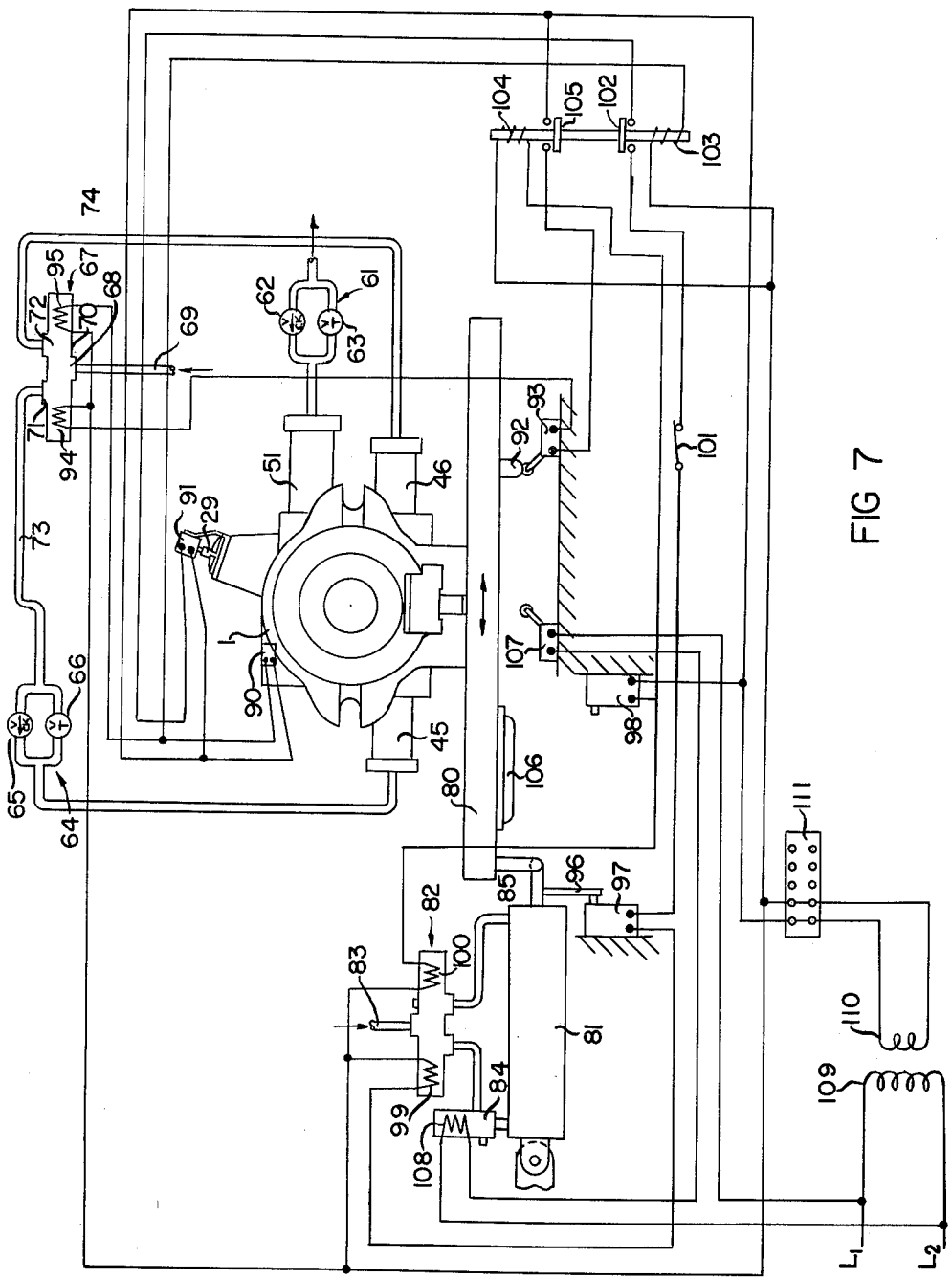

United States Patent Office 3,035,461
Patented May 22, 1962

3,035,461
AUTOMATIC INDEXER WITH SAFETY
INTERLOCKS
Milton L. Benjamin, Shaker Heights, and David D.
Walker, Chagrin Falls, Ohio, assignors to Erickson Tool
Company, Solon, Ohio, a corporation of Ohio
Filed Oct. 21, 1960, Ser. No. 64,065
4 Claims. (Cl. 74—822)

The present invention relates generally as indicated to an automatic indexer and, more particularly, to improvements in an index fixture of the general type disclosed in the Milton L. Benjamin et al. Pat. No. 2,600,960, granted June 17, 1952, and Milton L. Benjamin Pat. No. 2,883,886, granted April 28, 1959, which has associated therewith an automatic control system which renders the index fixture foolproof in operation aside from providing rapid, accurate indexing with smooth cushioning as the tool or work-carrying assembly approaches an indexed position.

The index fixture to which the present invention relates is intended for use in connection with machine tools, for example, milling machines wherein it is required to successively predeterminedly index a workpiece chucked on the fixture for operation upon by a tool. As illustrative examples are the milling of uniformly spaced longitudinal slots in contractible collets, the milling of uniformly spaced longitudinal grooves for forming splined shafts, the milling of wrench flats on round workpieces, etc. Obviously, in order to achieve maximum production the indexing should be accomplished in a minimum of time but, on the other hand, the large inertia forces involved in the rapid indexing of relatively large masses imposes excessive stresses on the motion-arresting and locking pin that is employed to stop the rotary indexing part of the fixture in its indexed position and to lock the same in such position. In order to maintain the locking pin and other parts under safe stresses, it had been the practice, prior to the evolution of the cushioning means disclosed in the aforesaid Pat. No. 2,883,886, to index at reduced speed, and consequently, at the expense of reduced production.

It is a primary object of this invention to provide an index fixture which has an automatic control system effective to automatically index the fixture and to advance and retract the same relatively toward and away from the tool, the control system being such as to render the index fixture foolproof in operation so that the index fixture actuating means will move the fixture to working position only after the fixture has been indexed and locked.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a rear elevation view of a preferred form of index fixture, the back cover plate having been removed to more clearly illustrate the construction of the parts within the housing of the fixture, and a portion of the stroke-cushioning cylinder being shown in section;

FIG. 2 is a fragmentary elevation view showing the inner end of the locking plunger and the cam plate for actuating the same;

FIG. 7 is a schematic piping and wiring diagram of the control system by which automatic indexing is achieved.

Figure 3:
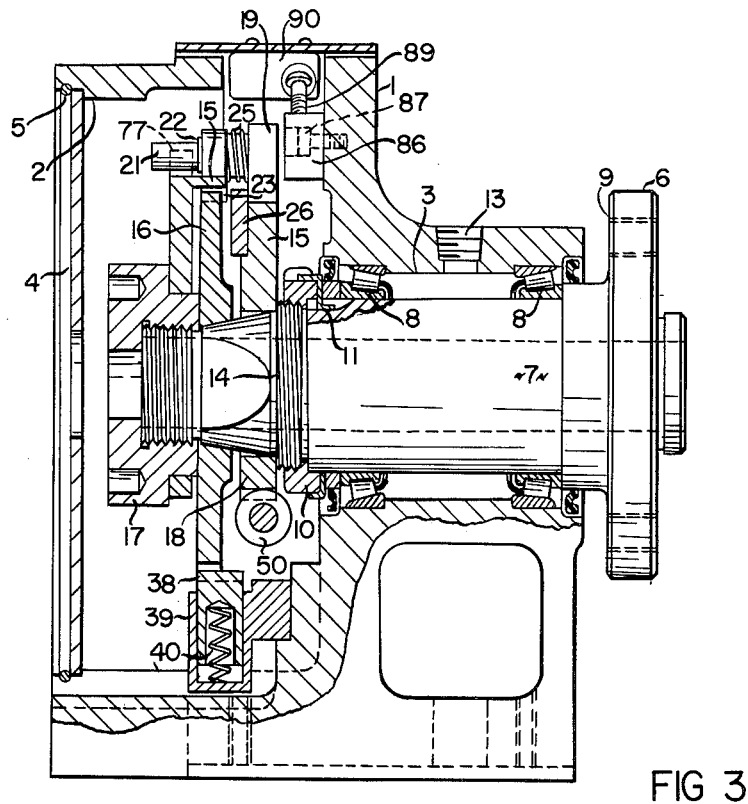
FIG. 3 is a cross-section view taken substantially along the line 3—3, FIG. 1.
Figure 4:
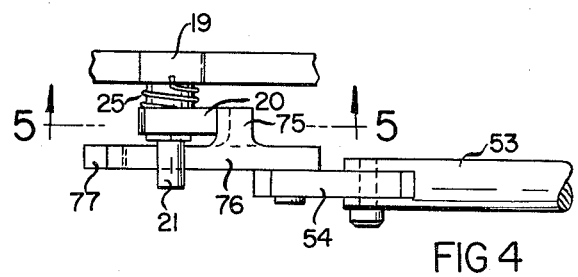
FIG. 4 is a fragmentary plan view of the lost-motion mechanism which is disposed between the cushioning cylinder (as shown in section in FIG. 1) and the indexing pawl support member to cushion the indexing movements of a ratchet wheel and which is operative to prevent overrunning of the ratchet wheel.
Figure 5:
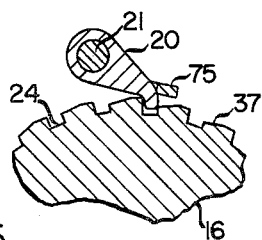
FIG. 5 is cross-section view taken substantially along the line 5—5, FIG. 4.
Figure 6:
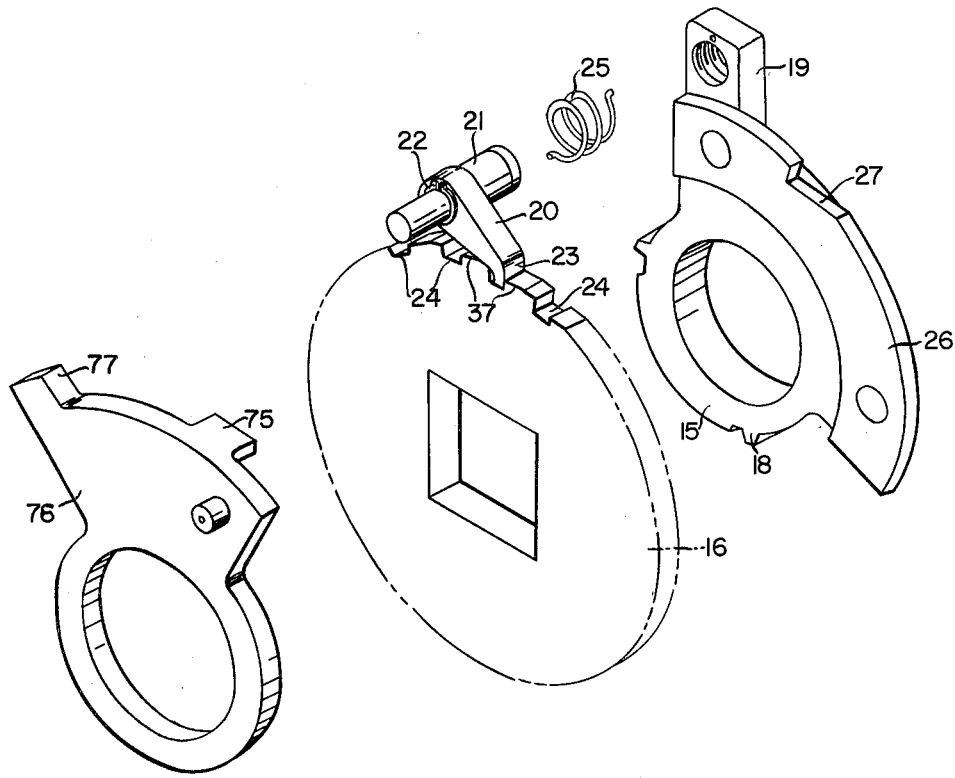
FIG. 6 is an exploded isometric view showing the driving pawl support member and the parts with which the driving pawl engages in operation.

Referring now to the drawings and first, more especially to FIGS. 1 to 6 thereof, there is shown a housing 1 formed with a recess 2 and a bore 3 leading into such recess. The recess 2 is closed as by means of a cover plate 4 which is fitted into the open end of said recess and is held in place therein as by means of the snap ring 5.

Rotatable in said bore 3 is a spindle 6 which includes an intermediate section 7 with tapered roller bearings 8 or the like journalling said spindle 6 for rotation about the axis of bore 3. The spindle 6 is formed with a flange 9 adjacent one end thereof for mounting a workpiece holding chuck and provided with a locknut 10 threaded onto the other end thereof, said locknut being held against rotation from adjusted position as by means of the lock washer 11 which is keyed to said spindle and which has one or more prongs bent as shown to engage in grooves or notches formed in the periphery of said locknut 10. As is apparent, the employment of opposed tapered roller bearings 8 enables the taking up of any wear to eliminate lateral and axial looseness or play. The front end of the spindle 6 is suitably formed as shown to enable mounting of a workpiece thereon, and in some instances, an air-operated chuck is mounted onto said spindle for gripping a workpiece or a tool.

The rear end of spindle 6 extends into recess 2 and is formed with a bearing surface 14 on which a pawl support member 15 is rotatable, and adjacent said pawl support member 15 and nonrotatable on said spindle 6 (as by means of interfitting tapered square portions) is a ratchet wheel 16, said pawl support member and said ratchet wheel being axially retained on said spindle as by means of the spindle nut 17. As will hereinafter more fully appear, ratchet wheel 16 and spindle 6 constitute a driven rotary indexing member, whereas said pawl support member 15 operates as a driving member.

Said pawl support member 15 (see especially FIG. 6) comprises a gear segment 18 concentric with the axis of rotation of said member and a radially projecting lug 19 to which a driving pawl 20 is pivotally mounted through the intermediary of a pawl bolt 21 threaded into said lug and provided with a snap ring 22 retaining said pawl on said bolt. The end 23 of said pawl is adapted to be engaged in one of the interdental spaces or notches 24 in the periphery of said ratchet wheel 16 and is so formed as to click over the ratchet wheel notches only in the counterclockwise direction of movement of said pawl and its support member. A torsion spring 25 around the bolt 21 having its axially directed ends fitting into holes in said pawl 20 and lug 19 respectively, is operative to rotate the pawl to a position with the end 23 thereof disposed in one of the interdental spaces 24.

Bolted or otherwise attached to said pawl support member 15 is an arcuate cam plate 26 (see FIGS. 1, 2, and 3) which is formed with a cam surface 27 engageable with the inner end 28 of a locking plunger or lock member 29 which is radially reciprocably mounted in said housing 1. Said locking plunger 29 is reciprocable in tubular, exteriorly tapered insert 30 driven into the boss 31 of said housing, said locking plunger being held against rotation as by means of the key 32 thereof which is slidable in a complementary keyway 33 in said insert. Said locking plunger 29 is urged radially inward by means of the compression spring 34 which is interposed between said plunger and a cap 35 threaded into the outer end of said boss 31. The inner end portion 28 of said plunger 29 may be slightly tapered on its opposite sides, and the end surface 36 thereof may be at an angle relative to a line tangent to the end of the plunger so as to facilitate the entry of the plunger end portion 28 into the desired interdental spaces or notches 24 between the teeth of the ratchet wheel 16. The teeth of said ratchet wheel 16 slope on one side as represented by the reference numeral 37 so that, as the ratchet wheel 16 rotates and the cam surface 27 of the cam plate 26 has disengaged from the plunger end 28, the latter may move radially inward so that its left side abuts the right-hand side of the next tooth to thus arrest the rotation of the ratchet wheel 16.

In order to hold ratchet wheel 16 against rotation during the counterclockwise rotation of the pawl support member 15, there is provided a spring-actuated holding pawl 38 slidably supported in a block 39, said pawl being urged into engagement with the ratchet wheel 16 as by means of the compression spring 40. The pawl mounting block 39 is adjustably mounted in the housing by the screw 41 so that said pawl may be adjusted back and forth to engage the side of the ratchet wheel tooth thereadjacent when the locking plunger is properly engaged with one of the interdental spaces of the ratchet wheel.

The lug 19 of said pawl support member 15 is engageable with a stop pin 42 in housing 1 to limit the extent of counterclockwise movement of said member 15, said stop pin 42 being insertable into any one of a plurality of openings 43, whereby the indexing movement may constitute any multiple of the angle between successive notches of the twenty-four tooth ratchet wheel 16, herein shown for purposes of illustration.

Oscillation of said pawl support member 15 in opposite directions is effected by reciprocation of the movable element of a fluid power device, said fluid power device as herein illustrated comprising coaxial single-acting cylinders 45 and 46 secured on opposite sides of housing 1 and a movable element in the form of pistons 47 and 48 respectively reciprocable in said cylinders and having a common piston rod 49 therebetween formed with annular grooves 50 in engagement with the teeth of the gear segment 18. With an arrangement as shown, the rotary or lateral disposition of the piston rod 49 does not, in any way change the rotary position of the gear segment 18.

There is also secured to housing 1 (see FIG. 1) a cylinder 51 in which a piston 52 is reciprocable, the piston rod 53 thereof being connected by a link 54 to the lost motion part 76 on the pawl support member 15. Attached to this cylinder 51 is a cylinder head 55 to the port 56 of which is connected a flow control valve 61 (see FIG. 7 also) which essentially comprises a check valve 62 and a throttle or needle valve 63 arranged in parallel so that air may freely pass into the cylinder 51 through the check valve 62, but air from said cylinder can only be exhausted through the adjustable throttle valve 63.

It is thus apparent that when the piston 52 is at the left-hand end of the cylinder 51 and is moved toward the right, air in said cylinder 51 will be exhausted through the throttle valve 63 whereby the air is compressed and cushioning of the right-hand movement is effected. Then, as the piston 52 moves close to the cylinder head 55, the air pressure in cylinder 51 builds up rapidly to effect greater cushioning at the very end of the indexing stroke. The throttle valve 63 preferably will be adjusted so as to permit only a very slow exhaust of air from the cylinder 51. Thus, at this final stage, a large cushioning or retarding action is effected on the continued right-hand movement of said piston 52.

A similar speed control valve 64 (see FIG. 7) including a check valve 65 and throttle valve 66 is preferably connected to the left-hand actuating cylinder 45. As shown in FIG. 7, a solenoid operated four-way valve 67 has one of its ports 68 connected to an air pressure supply pipe 69, another port 70 open to the atmosphere, and two other ports 71 and 72 respectively connected by pipes 73 and 74 to the speed control valve 64 and to the other actuating cylinder 46 respectively.

Now, when the four-way valve 67 is in one position air will pass freely through the check valve 65 in the flow control valve 64 into the left-hand cylinder 45, thereby causing the pistons 47 and 48 and piston rod 49 to move toward the right at a reasonably rapid rate, the cylinder 46 being connected to the atmosphere through the pipe 74 and the four-way valve 67. The right-hand movement of said pistons 47 and 48 and rod 49 causes the pawl support member 15 to be rotated through gear segment 18 in a counterclockwise direction until the lug 19 thereof engages the stop pin 42, carrying with it the driving pawl 20 and causing left-hand movement of the shock-absorber piston 52 in its cylinder 51 through the piston rod 53 and link 54 connection with the lost motion part 76 of the pawl support member 15. As the pawl support member 15 thus swings in a counterclockwise direction, the cam plate 26 thereof forces the locking plunger end 28 radially outward to disengage the end thereof from the interdental space of the ratchet wheel 16. Of course, during this counterclockwise rotation of the pawl support member 15, the ratchet wheel 16 is held against counterclockwise rotation by the holding pawl 38.

Now, when the four-way valve 67 is reversed, air under pressure will be admitted to the right-hand cylinder 46, and the exhaust from the left-hand cylinder will have to pass through the throttle valve 66 and thence through the four-way valve 67 to the atmosphere, the rate of flow being controlled by adjustment of said throttle valve 66. This adjustment will usually be made so that the movement of the pistons 47 and 48 and piston rod 49 toward the left will progress rather rapidly. As the pistons 47 and 48 and rod 49 thus move toward the left, the pawl support member 15 is driven in clockwise direction, the pawl 20 being engaged in one of the teeth of the ratchet wheel 16 and being held therein by means of the lateral cam lug 75 of the lost-motion part 76 on said support member 15 to which link 54 is connected. This cam lug 75 prevents overrunning of the ratchet wheel 16 and spindle 6. As the pawl support member 15, together with part 76, thus rotates clockwise, first a relatively small retarding force is applied thereon through the piston 52 moving toward the right in the cylinder 51, but as the pawl support member 15 approaches the indexing position, the air in cylinder 51 is compressed to such degree as to effectively retain the piston 52 movement, and thus, the pawl support member 15 is practically instantly halted within a very short portion of the stroke end of the indexing stroke, and at this time, the cam plate 26 has disengaged the locking plunger end 28 so that said plunger 29 can move radially inward along the sloped portion 27 of the ratchet wheel tooth next to the indexing notch, and then finally pops in radially into locking position to securely and accurately hold the ratchet wheel 16, the spindle 6, and the workpiece or tool mounted on said spindle in the indexed position.

Referring further to the lost-motion part 76, the same is rotatable on spindle nut 17 and has a projection 77 engaged by the side of the pawl bolt 21 after the initial part of the counterclockwise rotation of the support member 15. Such lost-motion permits the driving pawl 20 to disengage the lateral cam lug 75 and to click over the teeth of ratchet wheel 16. With the driving pawl 20 engaged in a new notch 24, the initial clockwise rotation of the support member 15 causes the pawl bolt 21 to move away from projection 77 whereby said pawl is positioned under the inclined face of lug 75 and thus when cushioning action is applied through piston rod 53 and link 54 on the lost-motion part 76, the ratchet wheel 16, spindle 6, and parts mounted on the latter are prevented from overrunning the pawl support member 15 and driving pawl 20 carried thereby.

Referring now in detail to the schematic piping and wiring diagram of the automatic indexer control system shown in FIG. 7, the index fixture housing 1 herein is adapted to be mounted on a reciprocable table 80 which is advanced and retracted by means of the double acting cylinder 81 and its associated solenoid operated four-way valve 82 to control flow of air under pressure from the air pressure supply line 83 into the head end of the cylinder via a solenoid operated valve 84 to move the piston 85 thereby to advance the table 80 and index fixture thereon toward the right, or into the rod end of the cylinder 81 to retract the piston 85 and thus the table 80 and index fixture toward the left.

The threaded holes 43 into any one of which the stop in 42 is screwed are formed in an arcuate plate 86 which is circumferentially movably supported in housing 1 by means of screws 87 that are screwed into housing 1 and that extend through circumferentially elongated arcuate slots in said plate 86. A spring 88 is effective normally to move said plate 86 in a clockwise direction as viewed in FIG. 1 whereby its switch actuating screw 89 permits opening of the normally open indexing switch 90. As explained later in detail, the switch 90 constitutes a safety interlock together with other switches and relay coils to prevent indexing until the table 80 is retracted and to prevent premature advancement of the table 80.

The bracket 35A of cap 35 for the locking plunger 29 carries a normally closed switch 91 which, as seen, will be closed only when the inner end 28 of the locking plunger 29 is properly engaged in an interdental space 24 of the ratchet wheel 16. As later explained in detail, the table 81 and index fixture thereon may not be advanced to working position unless this switch 91 is closed, thereby insuring that the spindle 6 is locked in its newly indexed position before the table 80 is advanced.

Mounted on the table is a cam 92 which, when the table 80 is in its retracted position of FIG. 7, closes the normally open indexer switch 93 and, as will be seen, the indexer 1 will not be cocked for indexing (actuation of piston 47 in cylinder 45) until this indexer switch 93 is closed. The cocking and indexing movements of the driving pawl support member 15 are controlled by the pistons 47 and 48 respectively. The four-way solenoid operated valve 67 comprises a solenoid 94 which, when energized, permits air flow into cylinder 45 to urge the piston 47 toward the right to cock the driving pawl 20 and support member 15 in a counterclockwise direction as viewed in FIG. 1 ready for indexing the spindle 6. The cocking operation aforesaid moves the locking plunger 29 radially outwardly to open the normally closed switch 91. The valve 67 also has a solenoid 95 which, when energized, actuates valve 67 to allow air pressure to flow into cylinder 46 to actuate the piston 48 therein to the left to cause indexing of spindle 6.

The piston 85 of cylinder 81 has a lug 96 thereon which at the end of the retract stroke of the table 80 closes the normally open advance switch 97 and which at the end of the advance stroke of the table 80 closes the normally open retract switch 98. These switches 97 and 98 control energization of the respective advance and retract solenoids 99 and 100 of valve 82. The switch 101 is a manually operated toggle switch or the like which is in circuit with advance switch 97 and the contactor 102 of a latch relay coil 103. The reset relay coil 104 has a contactor 105 in circuit with the normally open indexer switch 93 and also the normally closed switch 91 that is permitted to close when the locking plunger 29 is in locking engagement with the ratchet wheel 16.

The table 80 has mounted thereon a feed control cam 106 which, at the proper time during the advance of the table, closes the normally open switch 107 which, in turn, energizes the solenoid 108 of valve 84 to cut down the flow of air into the cylinder 81 and thereby decrease the rate of advance or feed movement of the table 80.

In FIG. 7 L–1 and L–2 denote the leads of an electric power supply line of, for instance, 115 v. and are connected to the solenoid 108 of the valve 84 through the normally open switch 107 in circuit with said solenoid. L–1 and L–2 are also connected to the primary winding 109 of a transformer, of which the secondary winding 110, of say 8 to 12 v., is connected with the first and second terminals of a terminal block 111.

*Operation*

When table 80 is in retracted position as shown in FIG. 7 (with toggle switch 101 open), a workpiece (not shown) to be splined, slotted, or otherwise worked upon is mounted on spindle 6. In that position of the table 80, the indexer switch 93 is closed by cam 92, thereby closing the secondary circuit including the contactor 105, switch 93, and solenoid 94 thereby to cock the indexer by air pressure entering cylinder 45. In so cocking, the indexer switch 90 is closed by lug 19 engaging stop pin 42 to move plate 86 so that screw 89 so closes switch 90, thereby closing the secondary circuit including latch relay coil 103, indexer switch 90, thereby to close the contactor 102. The closing of switch 90 closes a secondary circuit including the index solenoid 95 of valve 67 to permit air flow into cylinder 46 to index the spindle 6. Such indexing permits the locking plunger 29 to move into locking engagement with the ratchet wheel 16 and thereby closes the normally closed switch 91. However, as long as toggle switch 101 is open, the table 80 will remain in retracted position.

Now, when the toggle switch 101 is closed, a secondary circuit is closed including advance solenoid 99 of valve 82, closed advance switch 97, closed toggle switch 101, contactor 102, and closed switch 91, thereby to move the piston 85 in cylinder 81 toward the right to advance the table 80.

As the table 80 and indexer thereon approach the working position, the cam 106 on the table 80 closes the normally open switch 107 and thus a primary circuit is established through the valve 84 in the air pressure supply line which restricts the flow of air into the table actuating cylinder 81 so that the working portion of the stroke (the workpiece on spindle 6 engaged with the tool) is reduced in lineal speed.

Finally, when the retract switch 98 is contacted by the lug 96 on the piston 85, a secondary circuit is established through the retract solenoid 100 of valve 82 to admit air under pressure into the rod end of the cylinder 81 and at the same time another secondary circuit is established to energize the reset coil 104 which closes the contactor 105 (and opens contactor 102) ready for performing the successive cocking and indexing movements after the table 80 has been retracted and the cam 92 on the table has closed the normally open indexer switch 93. After cocking and indexing, the table will be automatically advanced and retracted.

From the foregoing, it can be seen that:

(1) The table 80 and indexer thereon cannot advance unless all the components in the advance solenoid 99 circuit are closed, namely the advance switch 97, the toggle switch 101, the contactor 102 of the latch relay coil 103, and the indexer switch 91, the closing of the contactor 102 being dependent upon prior closing of the index switch 90 and energization of latch relay coil 103;

(2) The indexer on table 80 cannot cock unless contactor 105 is closed (by previous energization of reset relay coil 104 by closing of retract switch 98 by lug 96), and unless indexer switch 93 is closed by cam 92 when the table 80 reaches its retracted position; and (3) The indexer on table 80 cannot index unless indexer switch 90 is closed at the conclusion of the cocking operation (lug 19 of the pawl support member 15 engaging and closing the switch 90) to establish a circuit through the index solenoid 95 of the valve 67.

Other modes of applying the principle of the invention may be employed, change being made as regards the details described, provided the features stated in any of the following claims, or the equivalent of such, be employed.

We therefore particularly point out and distinctly claim as our invention:

1. An indexer comprising a housing; a ratchet wheel rotatably supported by said housing; oscillating means having unidirectional driving engagement with said ratchet wheel for rotatably indexing the latter during alternate strokes of said oscillating means; a locking plunger having an inner end portion movable radially into and out of engagement with said wheel respectively to lock said wheel against rotation and to unlock said wheel for rotation from one indexed position to the next; a cam operated by said oscillating means for urging said plunger to wheel unlocking position and for permitting said plunger to move to wheel locking position; power means operatively connected to said oscillating means; and control means for said power means including a normally open switch which is closed by said oscillating means at the end of its non-driving stroke prior to its indexing stroke for rotatably indexing said ratchet wheel, and a normally closed switch which is opened by said locking plunger when in wheel unlocking position; such closing of said normally open switch energizing said power means to initiate the indexing stroke of said oscillating means; such opening of said normally closed switch indicating that said locking plunger is in wheel unlocking position.

2. An indexer comprising a housing; a ratchet wheel rotatably supported by said housing; an oscillating pawl support member having a driving pawl in unidirectional driving engagement with said ratchet wheel for rotatably indexing the latter during alternate strokes of said pawl support member; a spring-biased locking plunger having an inner end portion movable radially into and out of engagement with said wheel respectively to lock said wheel against rotation and to unlock said wheel for rotation from one indexed position to the next; a cam operated by said oscillating means for urging said plunger to wheel unlocking position and for permitting said plunger to move to wheel locking position under the influence of the spring acting thereon; power means operatively connected to said pawl support member; and control means for said power means including a normally open switch which is closed by said pawl support member at the end of its non-driving stroke prior to its indexing stroke for rotatably indexing said ratchet wheel, and a normally closed switch which is opened by said locking plunger when in wheel unlocking position; such closing of said normally open switch energizing said power means to initiate the indexing stroke of said pawl support member; such opening of said normally closed switch indicating that said locking plunger is in wheel unlocking position.

3. The indexer of claim 1 wherein said normally open switch is closed by an arcuately movable plate in said housing which is engaged by said oscillating means during the non-driving stroke of said oscillating means.

4. The indexer of claim 3 wherein said plate is spring-biased in a direction to permit opening of said normally open switch upon commencement of the indexing stroke of said oscillating means.

References Cited in the file of this patent

UNITED STATES PATENTS

| 2,180,771 | Poole | Nov. 21, 1939 |
| 2,366,045 | McKinney | Dec. 26, 1944 |
| 2,407,970 | Andrews et al. | Sept. 24, 1946 |
| 2,883,886 | Benjamin | Apr. 28, 1959 |
| 2,948,166 | Purse et al. | Aug. 9, 1960 |